W. E. HEBERLING.
PRESSURE INDICATING MECHANISM FOR PNEUMATIC TIRED VEHICLES.
APPLICATION FILED MAR. 19, 1914.

1,165,876.

Patented Dec. 28, 1915.

WITNESSES

INVENTOR
Wilbur E. Heberling
by C. M. Clarke
his attorney

UNITED STATES PATENT OFFICE.

WILBER E. HEBERLING, OF YOUNGSTOWN, OHIO, ASSIGNOR OF ONE-FOURTH TO GEORGE GOODMAN, OF STRUTHERS, OHIO.

PRESSURE-INDICATING MECHANISM FOR PNEUMATIC-TIRED VEHICLES.

1,165,876.  Specification of Letters Patent.  Patented Dec. 28, 1915.

Application filed March 19, 1914. Serial No. 825,871.

*To all whom it may concern:*

Be it known that I, WILBER E. HEBERLING, a citizen of the United States, residing at Youngstown, in the county of Mahoning and State of Ohio, have invented certain new and useful Improvements in Pressure-Indicating Mechanism for Pneumatic-Tired Vehicles, of which the following is a specification.
My invention consists of an improvement in pressure indicating mechanism for pneumatic tired vehicles, and has for its object to provide means for indicating at all times the air pressure within the several pneumatic tires of the vehicle, as an automobile, The object of the invention is to enable the user of the vehicle to ascertain the pressure condition in each separate wheel at a glance, and to provide a piping system connecting the several wheels with pressure indicators, and also with a connected pump, whereby to renew or maintain the pressure at a desired standard maximum.

Figure 1:
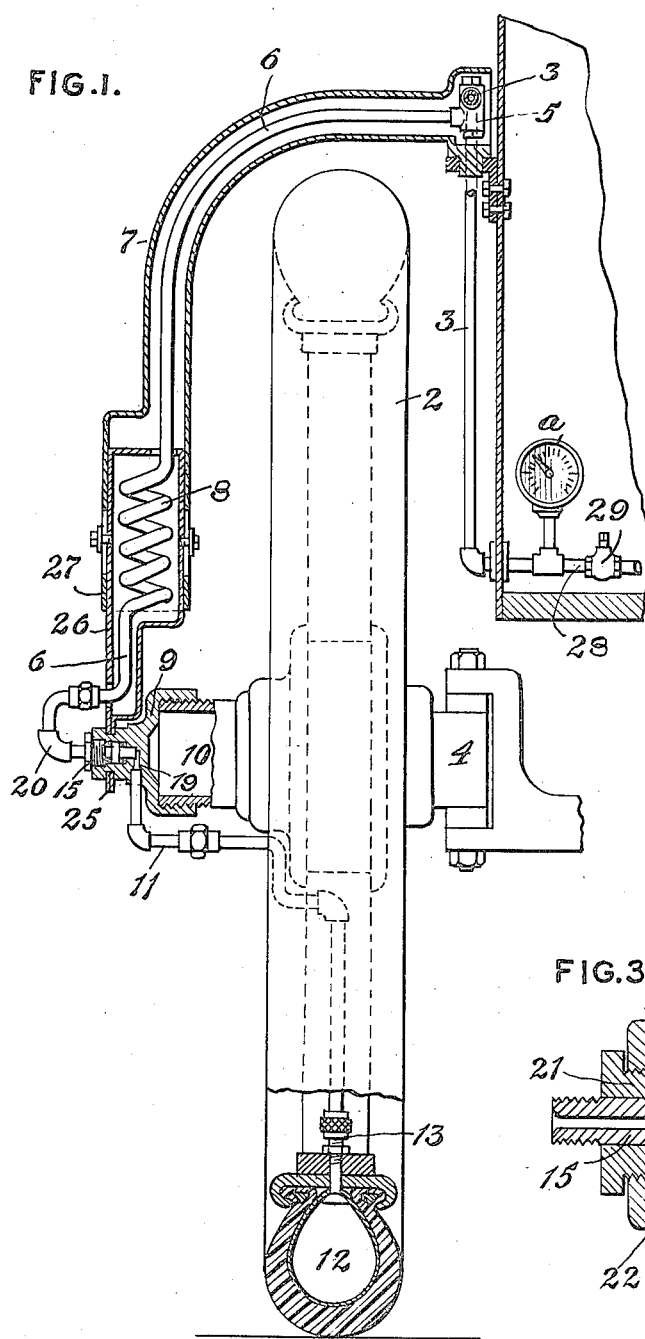
Figure 2:
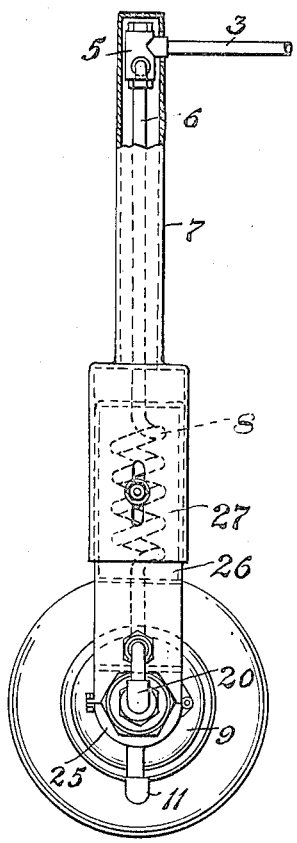
Figure 3:
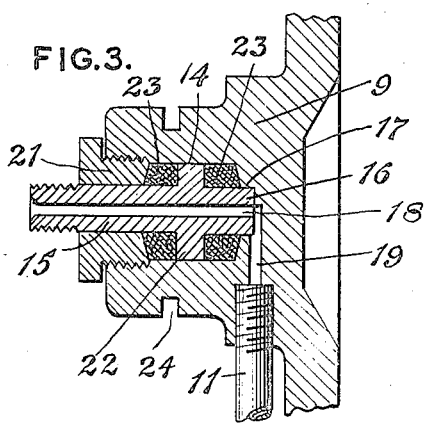

In the drawings illustrating the invention, I have shown the same as applied to one of the usual types of pneumatic wheels, although it will be understood that the invention is not to be limited to any particular construction.
In the drawings, Figure 1 shows a pneumatic wheel, partly in section, and partly in edge elevation, provided with the device. Fig. 2 is a face view of the device in elevation, showing the connection with the hub.
Fig. 3 is an enlarged longitudinal sectional view showing the connection between the rotating wheel and the pressure pipe.

The several wheels 2 of the automobile or other vehicle are, as usual, rotatably mounted on their bearings, either loosely, as in the case of the front wheels or in connection with the driving gears, as in the rear wheels. At any convenient position on the vehicle, and preferably on the inner side of the dash, I provide a series of pressure indicators, one for each wheel, as *a*. Each particular indicator *a* is connected by a pipe 3 with an air tight joint at the outer portion of the hub of each wheel respectively. In the construction shown, connection is made with the front wheel of the machine, which is customarily mounted for turning by a pivotal mounting 4 of well-known construction. Pipe 3 is therefore connected by a suitable joint 5, in alinement with the pivotal mounting 4, whereby to provide for turning of the attached connected piping 6. Pipe section 6 extends around the periphery of the wheel, as shown, within a suitable shield or casing 7, and is preferably provided with an elastic coiled section 8 to compensate for variations in level under the usual vibrations and shocks of travel.

At the outer portion of the hub of each wheel, a chambered casing 9 is provided, screwed upon and rotatable with the hub 10 and extending outwardly beyond it. Connected with the side of chambered casing 9 is a pipe 11, communicating with the interior pressure space 12 of the wheel, such connection being made with the usual pump nipple 13. Pipe 11 as thus connected is nested snugly between the spokes and closely adjacent to the hub, avoiding any unnecessary projections, and providing communication at all times between the air cavity of the tire and the central chambered rotatable cap 9. Said cap, as shown, is provided with a central longitudinal cavity 14 within which is mounted a spindle 15, the inner end 16 of which extends inwardly within the inner cylindrical extension 17 of cap 9, and is provided with a central port 18. Said port is in constant communication with port 19, which in turn communicates with pipe 11, so that port 18 of spindle 15 is always in communication with the wheel cavity 12. Spindle 15 is connected by elbow 20 or other suitable fitting with the lower terminal of pipe 7, which is relatively stationary, as is spindle 15. The outer neck of spindle 15 is surrounded by a bushing 21 screwed into the outer end of cap 9, while the inner portion of the spindle is provided with an annular projecting collar or ring 22. This collar makes a practically air tight, neat fit within the cylindrical cavity 14, so that rotation of the cap 9 around the spindle will maintain an air tight joint. At each side of the collar 22, I provide packing 23, 23, adapted to be compressed by bushing 21 to any desired degree, thus further insuring the sealing of the joint. As thus constructed, it will be seen that the spindle 15 may vary in position longitudinally of cap 9, but will always maintain circulation with the wheel. The outer portion of the cap is provided with an annular collar 24 for receiving the lower terminal 25 of telescoping section 26 of the protecting shield 7, the upper and lower portions of which are connected by an overlapping joint 27, as shown, to insure compensation for vertical variations. Each indicator a, and the pipe 3 leading to it, is in communication by a supplemental pipe 28 and check valve 29 with a pump attaching terminal of any suitable kind, or all of the connections may be joined by a common header so as to be supplied from a single pump, as will be readily understood.

The present invention constitutes an improvement on the construction shown and described in my prior application filed Dec. 11, 1913, No. 806131.

The advantages of the invention will be readily appreciated by all those familiar with the uses of automobiles.

The indication of individual tire pressures is very useful in avoiding unduly low pressures and resulting injury to the tires, or accidents which frequently occur due to such causes. When used as an entire system, with all of the wheels of the vehicle connected, I provide for uniformity of pressures and renewal of a deflated or partly deflated tire without any unnecessary delay.

Having described my invention, what I claim is:

1. The combination with a pneumatic tired wheel, of a centrally arranged rotatable chamber communicating with the tire, a relatively stationary conduit connected therewith and arranged outside of and around the wheel, and a relatively stationary indicator connected with said pipe through a conductor pipe having an intervening elastic coil, substantially as set forth.

2. The combination with a pneumatic tired wheel and a pivoted axle therefor of a centrally arranged rotatable chamber communicating with the tire, a relatively stationary conduit connected therewith and arranged outside of and around the wheel and provided with a hinge joint in alinement with the pivotal mounting of the axle, a relatively stationary indicator connected with said pipe, and means for renewing the pressure through said pipe connections embodying a check valve beyond the indicator, substantially as set forth.

In testimony whereof I hereunto affix my signature in the presence of two witnesses.

WILBER E. HEBERLING.

Witnesses:
JAMES A. MURRAY,
JOHN E. HECK, Jr.